United States Patent [19]

Ishibashi

[11] Patent Number: 4,563,708
[45] Date of Patent: Jan. 7, 1986

[54] METHOD AND APPARATUS FOR CONTROLLING STORAGE TIME IN CHARGE STORING PHOTOELECTRIC CONVERTER

[75] Inventor: Kenzo Ishibashi, Tokyo, Japan

[73] Assignee: Asahi Kogaku Kogyo Kabushiki Kaisha, Tokyo, Japan

[21] Appl. No.: 602,983

[22] Filed: Apr. 23, 1984

[30] Foreign Application Priority Data

Apr. 22, 1983 [JP] Japan .................................. 58-69997

[51] Int. Cl.⁴ .............................................. H04N 3/14
[52] U.S. Cl. ..................................... 358/213; 358/212
[58] Field of Search ............... 358/213, 212, 228, 227, 358/335, 906; 357/24 LR; 250/578; 307/311

[56] References Cited

U.S. PATENT DOCUMENTS 4,174,528  11/1979  White .................................. 358/213

Primary Examiner—Gene Z. Rubinson
Assistant Examiner—Stephen Brinich
Attorney, Agent, or Firm—Sughrue, Mion, Zinn, Macpeak and Seas

[57] ABSTRACT

A method and apparatus for controlling the storage time of light-detecting elements in a photoelectric converter device wherein a correct charge storing time is automatically established. A plurality of monitor light-detecting elements are provided adjacent the light-detecting elements of the photoelectric converter, with each of the monitor light-detecting elements being positioned adjacent and monitoring a group composed of plural ones of the light-detecting elements of the photoelectric converter. When any one of the monitor light-detecting elements has detected a predetermined amount of light, the storage of charge by the light-detecting elements of the photoelectric converter is terminated.

4 Claims, 10 Drawing Figures

METHOD AND APPARATUS FOR CONTROLLING STORAGE TIME IN CHARGE STORING PHOTOELECTRIC CONVERTER

BACKGROUND OF THE INVENTION

The present invention relates to a method and apparatus for controlling the storage time of a charge storing photoelectric converter.

A charge storing photoelectric converter composed of a plurality of light-detecting elements is well known in the art. The storage time of such a converter is controlled by one of the following methods:

(1) After the elapse of a selected storage time, the stored video signal is read out. Checking is then carried out to determine whether the signal level of the read-out video signal is appropriate for handling by the processing circuit. If the signal level is not appropriate, the storage time is set to another value and the above procedure is repeated until a video signal of the proper level is obtained. (This method is disclosed in Unexamined Published Japanese Patent Application No. 110209/80.)

(2) A single monitor light-detecting element is positioned adjacent to the plurality of light-detecting elements and the storage of video signals in the latter is completed when a predetermined amount of light is received by the monitor light-detecting element (See Unexamined Published Japanese Patent Application No. 64711/82).

(3) Each of the light-detecting elements is provided with a terminal for detecting the amount of light received and the storage of video signals is completed when any one of the terminals has received a predetermined amount of light.

The first method involves several storage operations before a video signal having the desired level is obtained, so that a prolonged period of time is necessary before the subsequent step of signal processing becomes possible. In the second method, the amount of charge stored in more than one light-detecting element is determined on the basis of the amount of light received by a single monitor element, and therefore, the peak value of the output video signal has undesirably great variations. The third method which makes use of the charges stored in one of the light-detecting elements responsible for actual photoelectric conversion outputs only a low quality signal.

Therefore, the primary object of the present invention is to provide a method and apparatus capable of determining the right storage time of a charge storing photoelectric converter without experiencing the defects of the conventional techniques.

SUMMARY OF THE INVENTION

In the method of the present invention, a plurality of monitor light-detecting elements are positioned adjacent to a group of light-detecting elements in a charge storing photoelectric converter, and the storage of charges in the group of light-detecting elements is completed when any one of the monitor light-detecting elements has received a predetermined amount of light.

The apparatus of the present invention includes a plurality of monitor light-detecting elements positioned adjacent to a group of light-detecting elements in a charge storing photoelectric converter, switch elements for applying a constant voltage to the respective monitor light-detecting elements when no charge is being stored in the group of light-detecting elements, comparators for comparing the terminal voltages of the respective monitor light-detecting elements with a reference voltage lower than the constant voltage while charges are stored in the group of light-detecting elements, and an OR gate producing the logical sum of the outputs of the comparators.

DESCRIPTION OF THE PREFERRED EMBODIMENTS

Several embodiments of the present invention will hereinunder be described with reference to the accompanying drawings.

Figure 1:
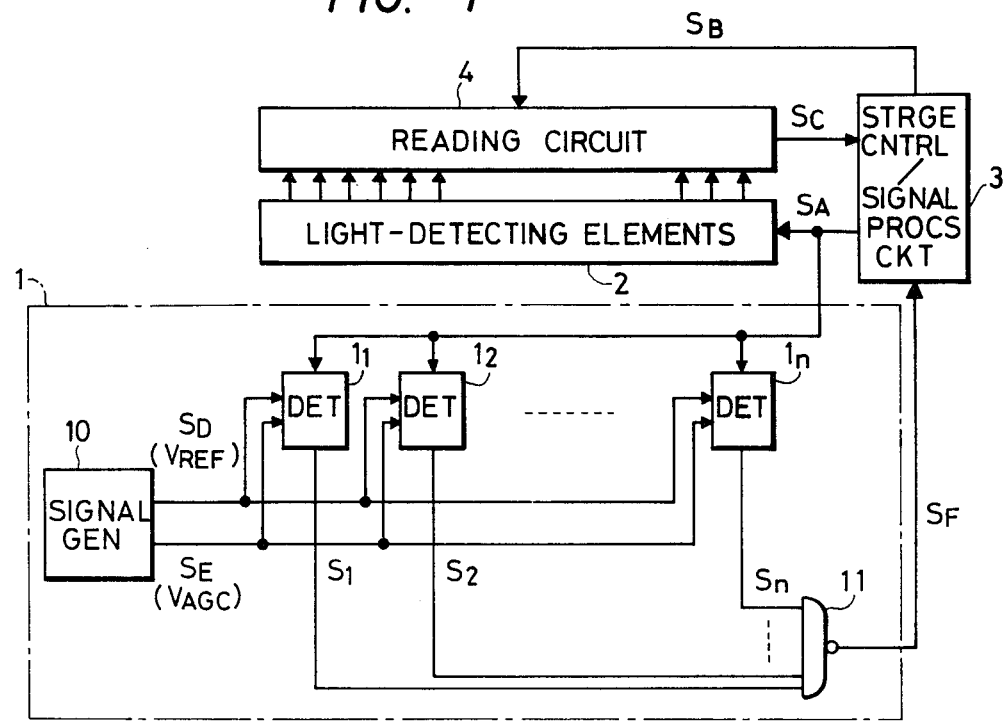
FIG. 1 is a block diagram showing a preferred embodiment of a storage time control apparatus of the present invention.

FIG. 1 is a block diagram showing a first embodiment of a storage time control apparatus according to the present invention. A group of light-detecting elements 2 included in a charge storing photoelectric converter such as a CCD sensor are charged when the logic level of a storage command signal $S_A$ produced by a storage control/signal processing circuit 3 is low and are cleared when the signal $S_A$ is high. When the logic level of a read signal $S_B$ produced by the circuit 3 changes from the low to the high level, a reading circuit 4 reads into the circuit 3 a series of video signal $S_C$ segments representing the charges stored in the group of light-detecting elements 2 and which together compose the video signal $S_C$.

Figure 2:
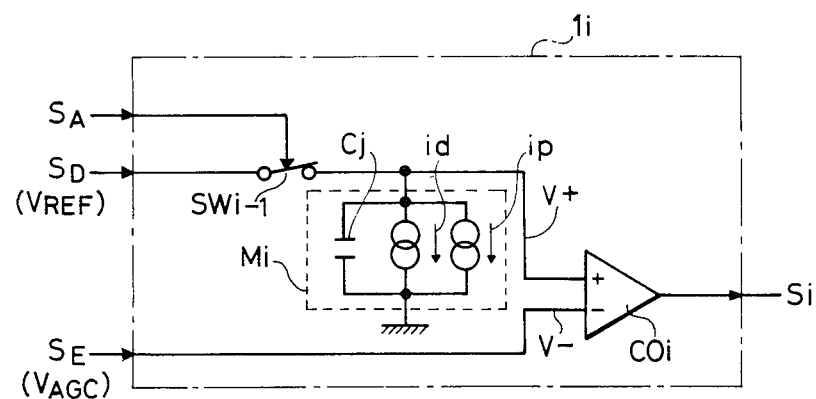
FIG. 2 is a circuit diagram showing an illustrative stored light detector.

The apparatus shown in FIG. 1 also includes a stored light detector 1 composed of stored light detector circuits $1_1, 1_2, \ldots 1_n$, a signal generator 10, and a NAND gate 11. As shown in FIG. 2, each of the stored light detector circuits, for instance, the detector $1_i$ ($i=1, 2, 3 \ldots n$), includes a switch element $SW_{i-1}$ which is turned on and off depending upon the logic level of a storage command signal $S_A$ from circuit 3, a monitor light-detecting element $M_i$ which receives through the switch element $SW_{i-1}$ a reference signal $S_D$ from the signal generator 10, and a comparator $CO_i$ composed of an operational amplifier which receives on its noninverting input terminal the reference signal $S_D$ through switch element $SW_{i-1}$ and on its inverting input terminal a comparison signal $S_E$ from the signal generator 10.

Figure 3:
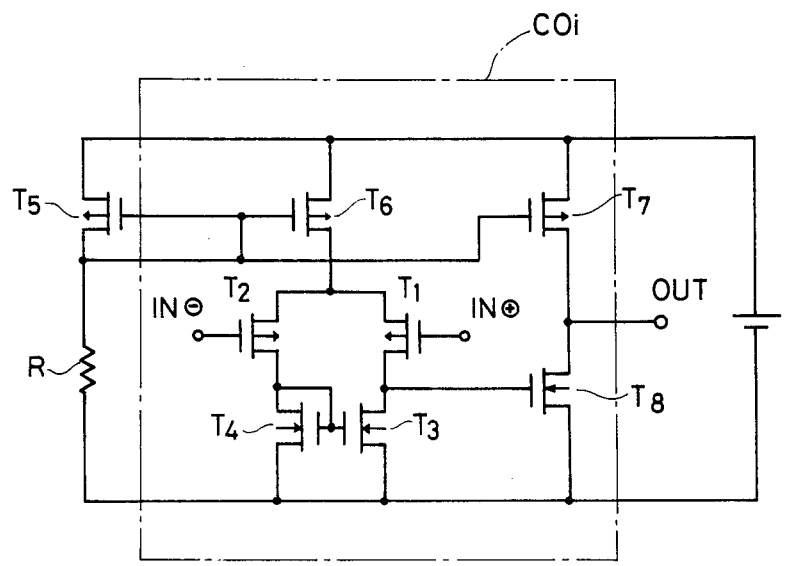
FIG. 3 is a circuit diagram showing the configuration of the comparator shown in FIG. 2.

As shown in FIG. 3, the comparator $CO_i$ includes a differential input stage made of FET devices T1 and T2, FET devices T3 and T4 providing active loads for the differential input stage, a constant current source composed of an FET device T5 and resistor R, FET devices T5 and T6 each functioning as a constant current source providing a current mirror for the constant current source formed by the device T5 and the resistor R, and an FET device T8 which has constant current supplying FET device T7 connected thereto as an active load and receives the output of the differential input stage as an input. Each of the elements T1, T2, T5, T6 and T7 is a p-channel MOS-FET, whereas the elements T3, T4 and T8 are each an n-channel MOS-FET.

In the comparator $CO_i$, the voltage of a signal supplied to the gate of T1 (the noninverting input terminal of the differential input stage) is transferred to the gate of T8 in negative phase and to the output terminal of T8 in positive phase.

Figure 4:
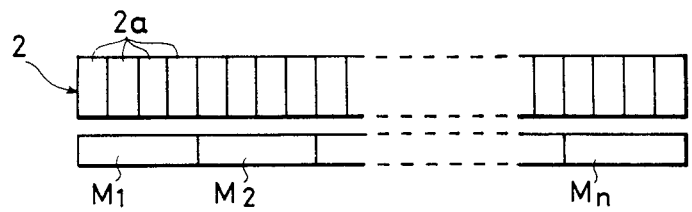
FIG. 4 is a schematic diagram illustrating the arrangement of monitor light-detecting elements with respect to a group of light-detecting elements.

The monitor light-detecting element $M_i$ ($i=1, 2, \ldots$ n), whose equivalent circuit is shown in FIG. 2, is positioned adjacent to the group of light-detecting elements 2 as illustrated in FIG. 4. In FIG. 4, four light-detecting elements $2a$ are monitored by one unit $M_i$. However, it should be understood that any number of light-detecting elements $2a$ can be monitored by a single monitor element.

The operation of the storage time control apparatus according to the first embodiment will now be described with reference to FIG. 5. When the logic level of the signal $S_A$ from the storage control/signal processing circuit 3 changes from high to low at $t_0$ as by waveform (1), the light-detecting elements 2 start to store charges as indicated by waveform (2), and at the same time, the switch $SW_{i-1}$ (FIG. 2) in each of the stored light detector circuits $1_1, 1_2, \ldots 1_n$ is opened. Then, the monitor light-detecting element $M_i$ also starts to store charge as a result of which the terminal voltage V+ of the element $M_i$ decreases in proportion to time, as shown by waveform (3). The symbol V+ indicates the change in the voltage at the terminal of the monitor light-detecting element $M_i$ that has received the maximum amount of light, whereas $V_1+$ shows the change in the voltage at the terminal of any one of the other monitor light-detecting elements. The symbols $V_{REF}$ and $V_{AGC}$ respectively indicate the voltages of the reference signal $S_D$ and the comparison signal $S_E$ produced by the signal generator 10.

At $t_1$, the terminal voltage V+ of the monitor element $M_{i-MAX}$ having maximum light reception becomes equal to $V_{AGC}$, that is, the voltage of the comparison signal $S_E$, whereupon the logic level of the output signal $S_{i-MAX}$ from the comparator $CO_{i-MAX}$ associated with the monitor element $M_{i-MAX}$ changes from high to low, as shown by waveform (4). At the time when the voltage V+ has decreased to $V_{AGC}$, charge will have been stored in the light-detecting elements 2 to a level sufficient to provide an adequate video signal.

Before $t_0$, output signals $S_1, S_2, \ldots S_n$ from the comparators $CO_1, CO_2, \ldots CO_n$ associated with the monitor elements $M_1, M_2, \ldots M_n$ are at the high level, so that the NAND gate 11 produces a low level output signal $S_F$. Therefore, if the comparator $CO_{i-MAX}$ associated with the monitor element $M_{i-MAX}$ produces a low level signal at $t_1$, the logic level of the signal $S_F$ will change to high, as shown by waveform (5).

In response to this change, the storage control/signal processing circuit 3 which receives the output signal $S_F$ from the NAND gate 11 sends a reading signal $S_B$ to the reading circuit 4 at $t_2$, as shown by waveform (6). The reading circuit 4 then supplies the circuit 3 with the charges of the light-receiving elements 2 in the form of a series of video signal $S_C$ segments. Upon receiving a predetermined number of video signal $S_C$ segments, the circuit 3 changes the logic level of the storage command signal $S_A$ to high at $t_3$, as shown by waveform (1). As a result, the light-detecting elements 2 are cleared, as shown by waveform (2), and at the same time, the voltage $V_{REF}$ of the reference signal $S_D$ is again supplied to the monitor element $M_i$ in the detector circuit $1_i$ through the switch element $SW_{i-1}$ (see FIG. 3). As a result, the logic level of the output signal $S_{i-MAX}$ from the comparator $CO_{i-MAX}$ becomes high and the logic level of the output signal $S_F$ from the NAND gate 11 becomes low, as shown by waveform (5).

The above procedure completes the first operation of collecting video signal $S_C$ segments. Then, the circuit 3 produces a low-level storage command signal $S_A$ at $T_0'$, which starts the second and subsequent sequences of video signal collection in the same manner.

Figure 6:
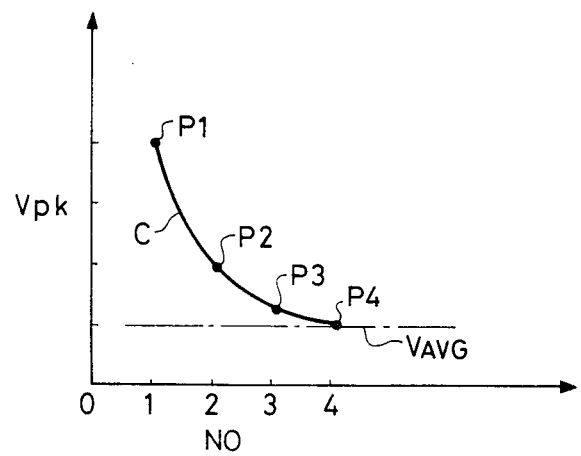
FIG. 6 is a graph showing the relation between the peak level of the video signal and the selectively illuminated light-detecting element.

The level of the thus collected video signal $S_C$ segments will now be described. The group of light-detecting elements 2 is illuminated uniformly in the direction of their width (see FIG. 4) but not uniformly in their longitudinal direction. Therefore, light-detecting elements $2a_{MAX}$ (four in FIG. 4) associated with the monitor element $M_{i-MAX}$ having maximum light reception produce video signal $S_C$ segments having different peak levels $V_{PK}$ as shown in FIG. 6. The signal level $V_{PK}$ of each of the four light-detecting elements $2a_{MAX}$ was measured by shielding from light the three elements other than the particular element under measurement.

A light-detecting element $2a$ whose peak level $V_P$ is the highest of all the video signal $S_C$ segments collected (see waveform (7)) is not necessarily found among the four elements $2a_{MAX}$ associated with the monitor element $M_{i-MAX}$. However, as will be shown below, the peak level $V_P$ will not exceed a value four times as high as the average level $V_{AVG}$ of the video signal $S_C$ segments.

With the amount of charge stored in the monitor light-detecting element $M_{i-MAX}$ designated by $Q_{m-MAX}$, the average amount of charge stored in the four light-detecting elements $2a_{MAX}$ associated with that monitor element by $Q_{pd-MAX}$, the amount of charge stored in another light-detecting element $2a_{PEAK}$ which may output a video signal of the peak level $V_P$ by $Q_{pd-PEAK}$, and the amount of charge stored in the monitor element $M_{i-PEAK}$ associated with that element by $Q_{m-PEAK}$, the following relation is estabished between $Q_{m-MAX}$ and $Q_{m-PEAK}$:

$$Q_{m-MAX} \geq Q_{m-PEAK}. \tag{1}$$

The two peak values of charge storage have the following relation:

$$Q_{m-MAX} = K \cdot (4 \cdot Q_{pd-MAX}), \tag{2}$$

where K is a constant of proportionality that depends on the dimensions of the light-detecting element $2a$ and the monitor element $M_j$.

If $Q_{pd-PEAK}$ exceeds a value four times as high as $Q_{pd-MAX}$, namely, if $$Q_{pc-PEAK} > 4 \cdot Q_{pd-MAX}, \tag{3}$$

the following equation is obtained (on the assumption that no charge is stored in the three light-detecting elements other than $2a_{PEAK}$ associated with the monitor element $M_{i-PEAK}$):

$$Q_{m-PEAK} = K \cdot Q_{pd-PEAK}. \quad (4)$$

From Relations (2) and (3), Equation (4) can be rewritten as:

$$Q_{m-PEAK} = K \cdot Q_{pd-PEAK} > K \cdot (4 \cdot Q_{pd\ MAX}) = Q_{m-MAX}. \quad (5)$$

but this result is obviously inconsistent with the requirement expressed by Inequality (1).

Therefore, $Q_{pd-PEAK}$ will not exceed a value four times as high as $Q_{pd-MAX}$. In other words, the light-detecting element $2a_{PEAK}$ will not output a video signal $S_C$ segment greater than the value of $P_1$ shown in FIG. 6. Since in no case will the light-detecting element $2a_{MAX}$ produce a peak output level $V_{PK}$ greater than $P_1$, the highest peak level $V_p$ of the video signal $S_C$ is $V_{PK} = P_1$.

If $V_{AVG}$, the average level of the video signal $S_C$, is assumed to be the level of the video signal $S_C$ segments obtained when all light-detecting elements $1a$ are illuminated uniformly, that level is determined by the difference between $V_{REF}$ and $V_{AGC}$, which are respectively the voltages of the reference signal $S_D$ and the comparison signal $S_E$ produced by the signal generator 10. This is indicated by:

$$\Delta V = V_{REF} - V_{AGC}. \quad (6)$$

As already mentioned, the peak level $V_P$ for all video signal segments is not more than four times as high as their average level $V_{AVG}$, and hence the latter can be set at a level which is one-fourth of the maximum level of the video signal that can be handled by the storage control/signal processing circuit 3.

As a further advantage, the light-detecting elements 2 are positioned separately from the monitor element $M_i$.

Further details of the operation of the stored light detector circuit $1_i$ shown in FIG. 2 will now be discussed along with an explanation of another configuration of that circuit and its operation.

Figure 5:
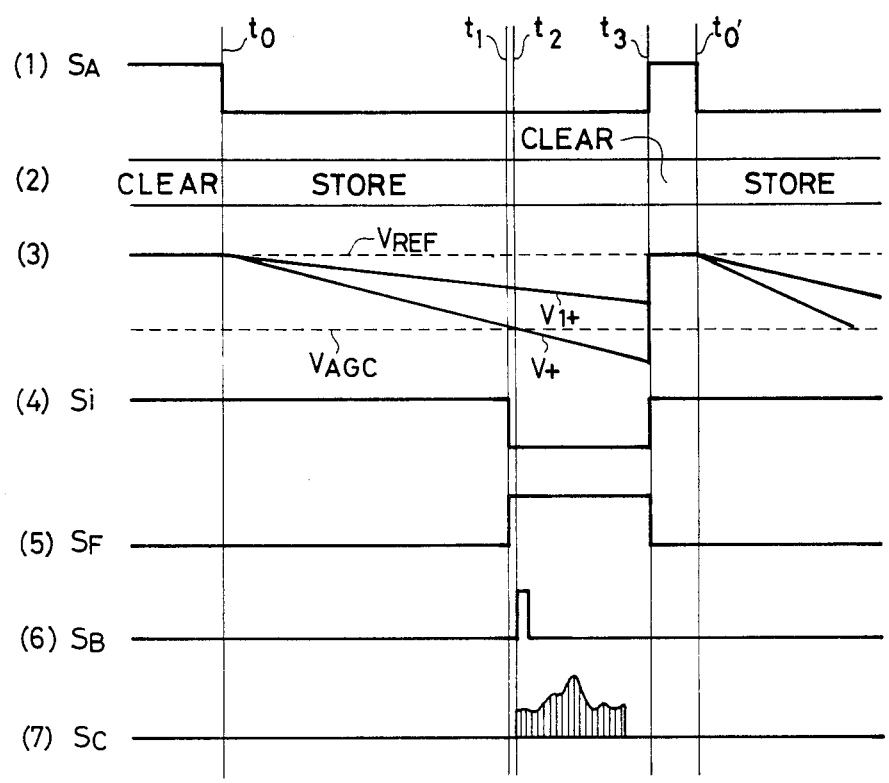
FIG. 5 is a timing chart illustrating the operation of the apparatus shown in FIG. 1.

After the switch element $SW_{i-1}$ in the detector circuit $1_i$ (FIG. 2) is opened, the terminal voltage of the monitor element $M_i$ (the voltage at the noninverting input terminal of the comparator $CO_i$) decreases linearly with time $(t-t_0)$ as shown in waveform (3) of FIG. 5. The linearity of this change is expressed by:

$$V+ = V_{REF} - (i_p + i_d) \cdot (t - t_0)/C_j. \quad (7)$$

where $i_p$ is the photo-current flowing through the monitor element $M_i$, $i_d$ is the dark current flowing through that element, and $C_j$ is the junction capacitance of $M_i$.

Rearranging Equations (6) and (7), the storage time, or equivalently the period extending form $t_0$ to $t_1$ when the voltage $V+$ is equal to $V_{AGC}$ at the inverting input terminal of the comparator $CO_i$, is expressed as follows:

$$T_1 - t_0 = \Delta V \cdot C_j/(i_p + i_d). \quad (8)$$

As is clear from Equation (8), the storage time $(r_1 - t_0)$ required by the stored light detector circuit $1_i$ of FIG. 2 decreases as more dark current $i_d$ flows through the monitor element $M_i$. Therefore, if the reading circuit 4 is designed so as to compensate for the dark current of the video signal $S_C$, and if the magnitude of the dark current $i_d$ flowing through the monitor element $M_i$ is not negligibly smaller than the photo-current $i_p$, the level of the video signal $S_C$ will be undesirably low.

Figure 7:
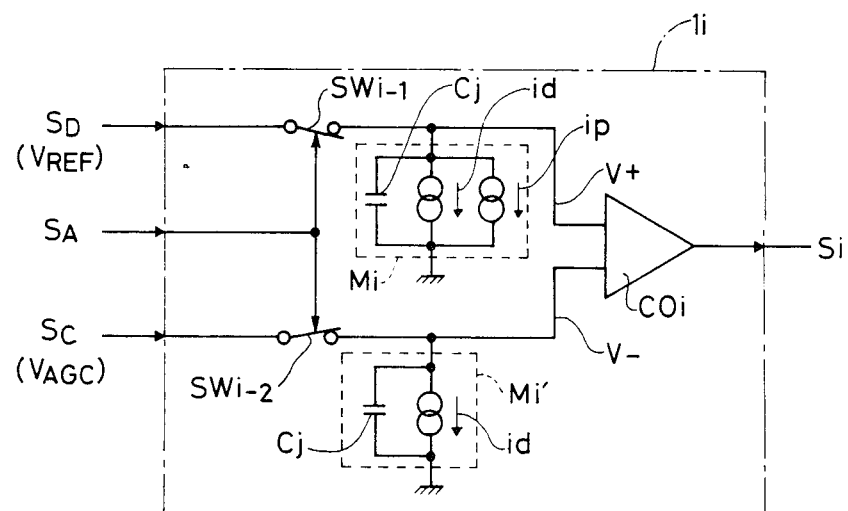
FIG. 7 is a circuit diagram showing another illustrative stored light detector.

FIG. 7 shows another embodiment of the detector circuit $1_i$ which avoids such a disadvantage. In this embodiment, the detector circuit $1_i$ further includes a switch element $SW_{i-2}$ that is opened when the logic level of the storage start command signal $S_A$ becomes low and a dark monitor light-detecting element $M_i'$. The circuit is so configured that the reference signal $V_{AGC}$ is supplied to both the dark monitor element $M_i'$ and the inverting input terminal of the comparator $CO_i$ through the switch element $SW_{i-2}$. The dark monitor element $M_i'$ is identical to the monitor element $M_i$ except that the former is shielded from light. Therefore, $M_i'$ has the same levels of dark current $i_d$ and junction capacitance $C_j$ as $M_i$.

Figure 8:
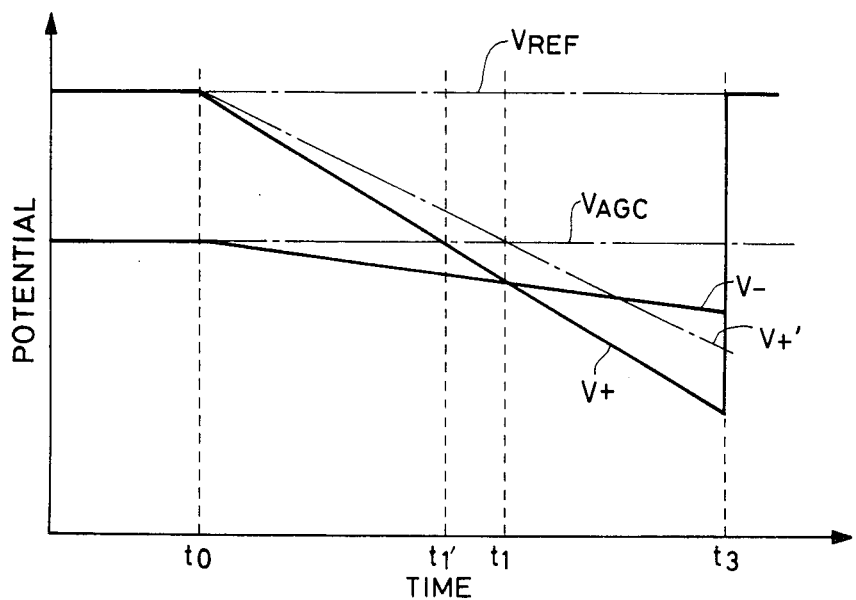
FIG. 8 is a timing chart used for explaining the operation of the circuit shown in FIG. 7.

The operation of the detector circuit 1 according to the second embodiment will be described with reference to FIG. 8. In FIG. 8, $V+'$ represents the change in the voltage at the noninverting input terminal of the comparator $CO_i$ when no dark current $i_d$ flows through the monitor element $M_i$ and the dark monitor element $M_i'$, whereas $V+$ represents a voltage change at the same terminal when some dark current is flowing. If the amount of dark current $i_d$ is not zero, the logic level of the output signal $S_i$ from the comparator $CO_i$ becomes low at time $t_1'$. However, in the presence of the dark monitor element $M_i'$, the potential $V-$ at the inverting input terminal of comparator $CO_i$ decreases linearly as shown in FIG. 8 starting at $t_0$, which is the time when both switch elements $SW_{i-2}$ and $SW_{i-1}$ are opened. Therefore, the logic level of the output signal $S_i$ from the comparator $CO_i$ becomes low at $t_1$ as in the case when $i_d = 0$.

The potential $V-$ at the inverting input terminal of the comparator $CO_i$ is given by:

$$V- = V_{AGC} - i_d \cdot (t - t_0)/C_j. \quad (9)$$

As discussed above, the stored light detector circuit $1_i$ shown in FIG. 7 is capable of compensating for dark current $i_d$, and even in the presence of dark current flowing through the monitor element $M_i$, the circuit yields results equivalent to those obtained when $i_d = 0$. Therefore, the stored time $(t - t_0)$ required in this circuit is represented by Equation (10), which is equivalent to Equation (8) except that $i_d$ is zero. That is:

$$t - t_0 = \Delta V \cdot C_j/i_p. \quad (10)$$

The actual storage time is $t_1 - t_0$. As in the case of the embodiment shown in FIG. 2, the detector circuit $1_i$ of Fig. 7 returns to its initial state at $t_3$.

Figure 9:
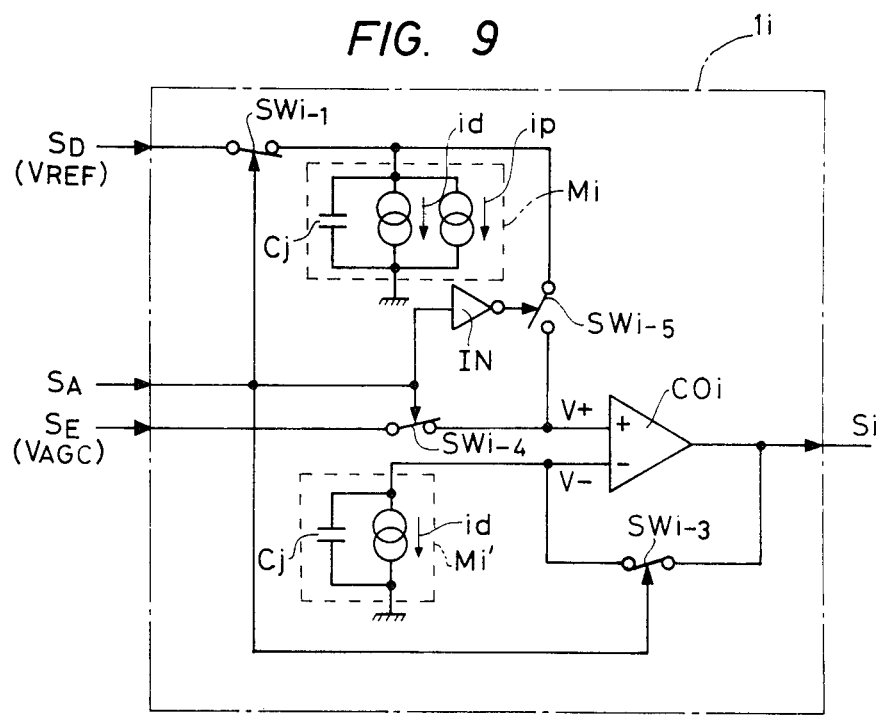
FIG. 9 is a circuit diagram showing a third illustrative stored light detector.

In the discussion above of the embodiments shown in FIGS. 2 and 7, the offset voltage of the comparator $CO_i$ is assumed to be negligible. However, in some cases, this offset voltage causes significant effects on the differential voltage $\Delta V$ given by Equation (6). FIG. 9 shows a further embodiment of the stored light detector circuit $1_i$ in which the undesired effects of the offset voltage are eliminated.

The detector circuit $1_i$ shown in FIG. 9 includes a switch element $SW_{i-3}$ provided between the inverting input terminal and the output terminal of the comparator $CO_i$. The switch element $SW_{i-3}$ is opened when the storage command signal $S_A$ changes to the low level. The detector circuit $1_i$ further includes a switch element $SW_{i-4}$ which is also opened when the signal $S_A$ changes to the low level and through which the comparison signal $S_E$ is fed to the noninverting input terminal of the comparator $CO_i$, an inverter IN for inverting the signal $S_A$, and a switch element $SW_{i-5}$ connected between the monitor element $M_i$ and the noninverting input terminal of the comparator $CO_i$ and which is closed when the logic level of the output terminal of the inverter IN becomes high.

The operation of the detector circuit $1_i$ shown in FIG. 9 will be described with reference to FIG. 10. Before $t_0$, the logic level of the storage command signal $S_A$ is high, and as shown in FIG. 9, the switch elements $SW_{i-1}$, $SW_{i-3}$ and $SW_{i-4}$ are closed whereas the switch element $SW_{i-5}$ is open. Therefore, the comparator $CO_i$, having its output terminal and inverting input terminal connected by the switch element $SW_{i-3}$, operates as a voltage follower circuit. The noninverting input terminal of the comparator $CO_i$ is supplied with the comparison signal $S_E$ ($V_{AGC}$). Thus, $V-$, which includes the offset voltage $V_{OF}$ of the comparator $CO_i$, is given by:

$$V-(t<t_0)=V_{AGC}-V_{OF}. \quad (11)$$

At the time $t_0$, the logic level of the command signal $S_A$ becomes low, whereupon the switch elements $SW_{i-1}$, $SW_{i-3}$ and $SW_{i-4}$ are opened and the switch element $SW_{i-5}$ is closed. As a result, the voltage $V-$ at the inverting input terminal of comparator $CO_i$ decreases linearly with time as shown in FIG. 10.

Figure 10:
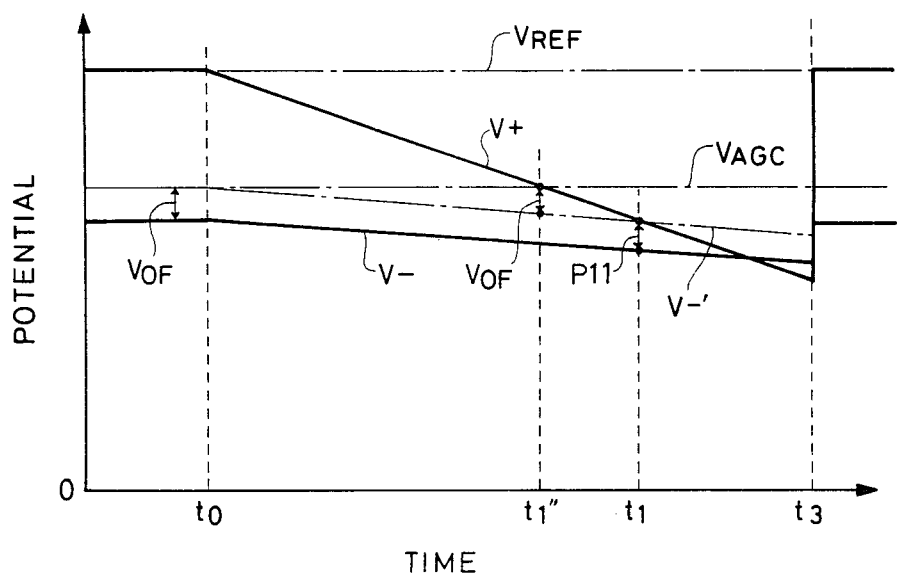
FIG. 10 is a timing chart describing the operation of the circuit shown in FIG. 9.

The symbol $V-'$ in FIG. 10 represents the change in voltage at the inverting input terminal of the comparator $CO_i$ included in the circuit of FIG. 7. In the embodiment of FIG. 7, if the comparator $CO_i$ has an offset voltage $V_{OF}$ of, for example, a positive polarity, the inverting input terminal of $CO_i$ is supplied with a voltage equal to the sum of $V-'$ and $V_{OF}$, and as a result, the output signal $S_i$ of the comparator $CO_i$ changes to the low level at the time $t_1''$. However, with the circuit $1_i$ of FIG. 9, the voltage at the inverting input terminal of the comparator $CO_i$ is $V-'$ minus $V_{OF}$, and the output signal $S_i$ of $CO_i$ changes to the low level at the time $t_1$ (FIG. 10). Therefore, the circuit $1_i$ of FIG. 9 is entirely free from the undesired effect of the offset voltage $V_{OF}$.

The potential profile for time $t_1$ when signal $S_i$ changes to the low level is given by:

$$V_{REF}-(i_p+i_d)(t-t_0)/C_j=V_{AGC}-V_{OF} \\ -i_d(t-t_0)/C_j+V_{OF}. \quad (12)$$

From this equation, the storage time determined by the detector circuit $1_i$ of FIG. 9 is given by (which is identical to Equation (10)):

$$t-t_0=\Delta V \cdot C_j/i_p. \quad (13)$$

Switch elements $SW_{i-1}$ and $SW_{i-2}$ shown in FIG. 7, as well as switch elements $SW_{i-3}$, $SW_{i-4}$ and $SW_{i-5}$ shown in FIG. 9, may be n-channel MOS-FETs. The NAND gate 11 shown in FIG. 1 functions substantially as a low-truth OR gate. The stored light detector circuit formed according to any of the embodiments shown above may be easily assembled in one package together with the charge storing photoelectric converter having a plurality of light-detecting elements 2. This integrated assembly ensures very easy signal processing and packaging.

According to the present invention, the proper storage time of charge storing photoelectric converters such as CCD sensors and MOS sensors can be provided by a single storage operation even under conditions where the amount of light received varies significantly. Furthermore, the invention provides a video signal of good quality that has a minimum change in the peak level. Therefore, the invention can be effectively applied to a charge storing photoelectric converter used in an autofocusing device in cameras.

I claim:

1. In a method for controlling the storage time in a charge storing photoelectric converter, wherein a plurality of monitor light-detecting elements are positioned adjacent to a group of light-detecting elements for receiving reflected light in the photoelectric converter such that the monitor light-detecting elements and their respective adjacent light-detecting elements receive substantially the same reflected light in a substantially identical optic path, the improvement comprising: terminating storage of charge in the group of light-detecting elements when any one of said monitor light-detecting elements has received a predetermined amount of light.

2. An apparatus for controlling the storage time in a charge storing photoelectric converter, comprising: a plurality of monitor light-detecting elements positioned adjacent to a group of light-detecting elements in the photoelectric converter; a plurality of switch elements for applying a constant voltage to respective monitor light-detecting elements when no charge is being stored in the group of light-detecting elements; a plurality of comparator means for comparing terminal voltages of the respective monitor light-detecting elements with a reference voltage lower than said constant voltage while charges are stored in the group of light-detecting elements; and an OR gate producing the logical sum of the outputs from said comparators.

3. The apparatus according to claim 2, wherein each of said comparator means comprises: a dark monitor light-detecting element which is shielded from light and has electrical characteristics equivalent to those of the associated monitor light-detecting element; a switch element which, when no charge is being stored in said group of light-detecting elements, supplies said dark monitor light-detecting elements with a predetermined voltage having a value different from said constant voltage; and a comparator for comparing a terminal voltage of said monitor light-detecting element with a terminal voltage of said dark monitor light-detecting element while charge is stored in said group of light-detecting elements.

4. The apparatus according to claim 2, wherein each of said comparator means comprises: a dark monitor light-detecting element which is shielded form light and has electrical characteristics equivalent to those of the associated monitor light-detecting element; a comparator comprising an operational amplifier; first switch element means for supplying, when no charge is being stored in said group of light-detecting elements, one input terminal of said comparator with a predetermined voltage having a value lower than said constant voltage; second switch element means for supplying a terminal voltage of said monitor light-detecting element to said one input terminal of said comparator while charges are being stored; and third switch element means for shorting an output terminal and the other input terminal of said comparator while no charge is being stored, said dark monitor light-detecting element being connected to said other input terminal of said comparator.

* * * * *